Aug. 28, 1956   A. R. BASFERD   2,760,811
LICENSE PLATE MOUNTS
Filed June 17, 1954
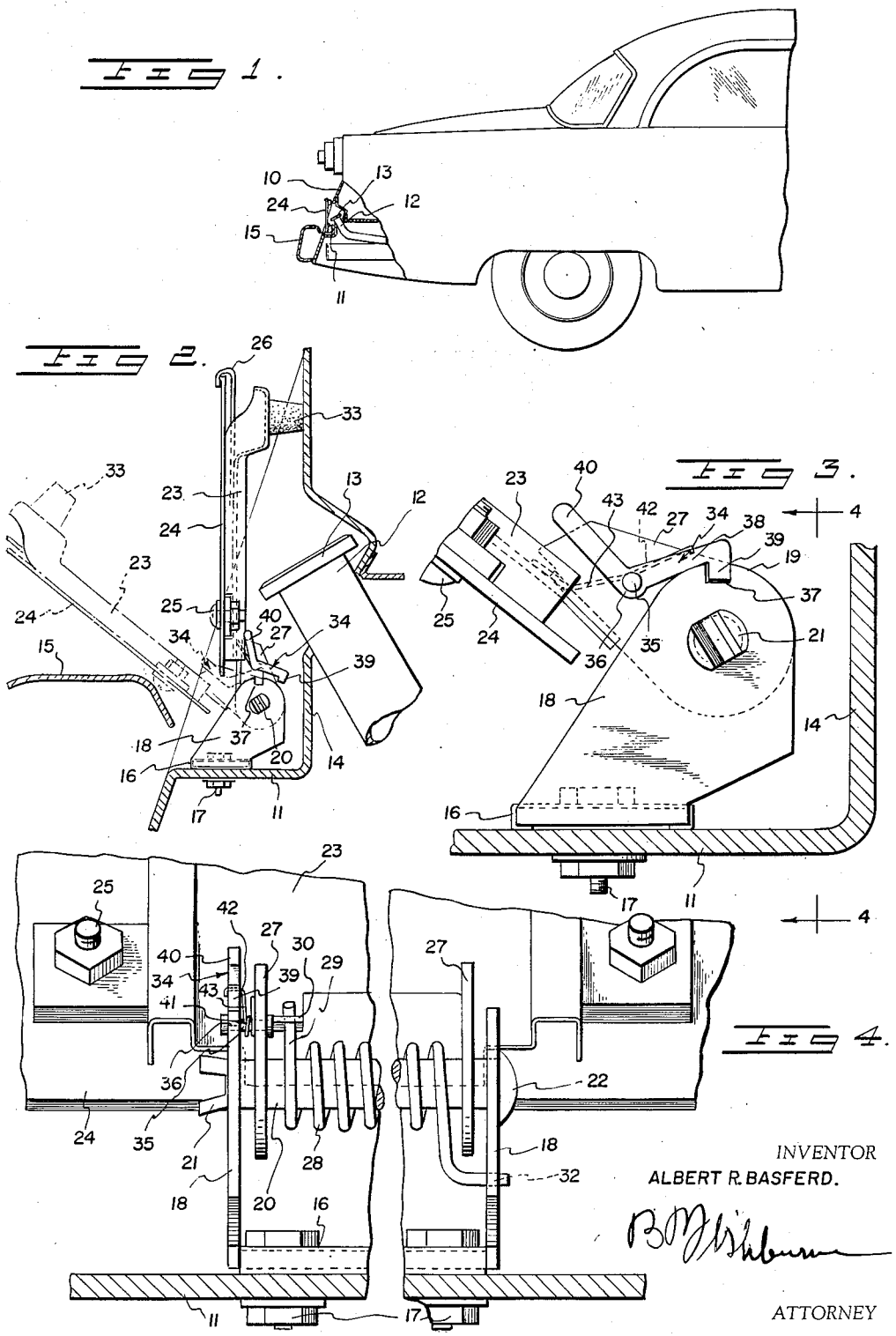
INVENTOR
ALBERT R. BASFERD.
ATTORNEY United States Patent Office 2,760,811
Patented Aug. 28, 1956

2,760,811

LICENSE PLATE MOUNTS

Albert R. Basferd, Washington, D. C.

Application June 17, 1954, Serial No. 437,463

1 Claim. (Cl. 296—1)

The present invention relates to license plate mounts for automobiles.

Certain well-known makes of automobiles have their gas tank closure caps arranged at the rear end of the body, below the trunk lid and substantially in the middle of the automobile. The automobile license plate is employed in these makes of cars to conceal or hide from view the gas tank closure cap. To do this, the rear license plate is carried by a holder adjacent to the gas tank closure cap, and the holder is hingedly secured to a mounting bracket at the bottom of the same and somewhat below the closure cap. The mounting bracket is secured to a horizontal ledge stamped or formed in the rear panel of the automobile body, just forwardly of the rear bumper. A strong spring is employed to normally maintain the license plate in the raised or vertical position for concealing the gas tank closure cap.

When the filling station attendant is filling the tank with gasoline, he must grasp the license plate and holder with one hand and pivot or swing it rearwardly against the action of the spring to a rearwardly inclined position for uncovering the gas tank closure cap. The closure cap is then removed with the other hand, and the fuel hose nozzle is then introduced into the gas tank filler pipe with the same hand, the attendant still holding the license plate in the lowered or inclined position with his other hand.

It frequently occurs that the license plate and holder are improperly released by the attendant, and under the influence of the strong spring which urges the license plate and holder to their vertical position, the same strike the fuel hose nozzle and cause it to be diverted and strike the rear end of the automobile, resulting in marring or scratching of the automobile paint. This may occur quite frequently where careless attendants are employed, and may even happen occasionally when normal care is exercised. In any event, it is a highly undesirable arrangement which may result in the loss of customers for the filling station and even claims for damages when the automobile paint is scratched.

It is accordingly the principal object of the present invention to provide means for releasably locking the license plate and holder in the lowered or inclined position while the gas tank is being filled, so that the spring cannot return the license plate and holder to their upright position until the means are released by the attendant, after withdrawal of the hose nozzle from the gas tank filler pipe.

Another object of the invention is to provide a highly simplified and inexpensive latch device or attachment for hinged license plate holders which will operate automatically to releasably lock the same in the lowered or inclined position during the gas tank filling operation.

Another object is to provide releasable latch means of the above-mentioned character which may be readily incorporated in new automobiles at the time of their manufacture, with a minimum of cost, and also applicable to existing automobiles equipped with the above type of hinged, spring loaded license plate holders, used to conceal the gas tank closure cap.

Other objects and advantages of the invention will be apparent during the course of the following description.

In the accompanying drawings, forming a part of this application, and in which like numerals are employed to designate like parts throughout the same, Figure 1 is a fragmentary side elevation, partly in section, of an automobile equipped with a license plate mount embodying the invention, Figure 2 is an enlarged fragmentary vertical section through the rear end of the automobile, showing the gas tank closure cap and the license plate mount which conceals the closure cap, in end elevation, Figure 3 is a further enlarged fragmentary vertical section similar to Figure 2 showing the license plate holder locked in the lowered or inclined position by the device of the present invention, and, Figure 4 is a vertical section taken on line 4—4 of Figure 3.

In the drawings, where for the purpose of illustration is shown a preferred embodiment of the invention, the numeral 10 designates the rear end or panel of a well-known make of automobile, formed to provide a horizontal ledge 11 near and below the top end of the gas tank filler pipe 12, having the usual removable closure cap 13. The filler pipe 12 projects through an opening formed in a forwardly offset generally vertical portion 14 of the rear panel 10, as best shown in Figure 2. The rear bumper 15 of the automobile is disposed rearwardly of the horizontal ledge 11, with its top slightly above the ledge and somewhat below the closure cap 13.

The license plate mount comprises a generally flat elongated mounting bracket or plate 16, rigidly secured upon the top of the horizontal ledge 11 by suitable bolts 17, or the like. The elongated bracket 16 extends transversely of the automobile directly rearwardly of the panel portion 14 and filler pipe 12, as shown. The bracket 16 is provided at its ends with upstanding vertical extensions or arms 18, rigidly secured thereto and preferably integral therewith, and these extensions 18 terminate some distance below the top of the filler pipe 12 as shown in Figure 2. The upper ends of the extensions 18 are arcuate or rounded as at 19, and the extensions 18 are apertured near their upper ends for receiving a long horizontal pintle 20 which extends therebetween and is spaced above the ledge 11 and the bottom of the bracket 10 a substantial distance. One end of the pintle 20 is split and spread as shown at 21, for maintaining the pintle within the aligned apertures of the extensions 18. The opposite end of the pintle is headed as at 22 in Figure 4.

A license plate carrying member or holder generally in the form of a plate 23 is provided, and this holder or plate 23 carries the license plate 24 upon its rear side, as shown. The license plate is rigidly secured to the holder 23 near its bottom by means of bolts 25 or the like, and a vertically adjustable hook 26 forming a part of the holder 23 may engage the upper edge of the license plate 24 to further steady the same.

The holder or plate 23 is provided at its lower end with a pair of vertically disposed apertured attaching plates, extensions or ears 27, rigidly secured thereto and projecting forwardly of the holder 23 in spaced relation. The extensions 27 are arranged just inwardly of and between the upright extensions 18, with their apertures receiving the pintle 20, and being in registration with the pintle receiving apertures of the extensions 18. The pintle 20 thus serves to hingedly connect the holder 23 and license plate to the stationary mounting bracket 16 upon the ledge 11, so that the holder and license plate may swing vertically above the mounting bracket 16, toward and from the panel portion 14.

A rather strong torsional coil spring 28 surrounds the pintle 20 throughout the major portion of its length, between the holder extensions 27. One end extension 29 of the spring 28 is anchored to an apertured lug 30, struck from the holder 23 near its lower end, and near and inwardly of the adjacent extension 27. The other end extension 31 of the coil spring 28 is anchored within an aperture 32 formed in the upright extension 18 at the opposite end of the mounting bracket 16. The spring 28 is tensioned to bias or urge the holder 23 and license plate 24 forwardly or toward their vertical position shown in Figure 2. The torsion spring 28 being quite strong, urges the holder 23 upwardly and forwardly with a considerable pressure.

A pair of relatively soft rubber feet or bumpers 33 are secured to the forward side of the holder 23 adjacent its upper corners, and these bumpers 33 contact the vertical panel portion 14 above the filler pipe 12 to limit the forward swinging movement of the holder 23 under the influence of the spring 28. The bumpers 33 prevent the metal holder 23 or license plate 24 from contacting the painted panel portion 14, and serve to maintain the holder 23 and license plate normally vertical under the influence of the spring 28. As shown in Figure 2, the holder 23 and license plate 24, when in the vertical position, are spaced slightly rearwardly of the filler pipe 12 and closure cap 13. The license plate 24 and holder 23 thus serve to normally conceal the closure cap 13 and pipe 12 from view.

When it is desired to fill the automobile gas tank with fuel, the attendant in the filling station grasps the holder 23 and license plate with one hand and swings them rearwardly and downwardly about the axis of the pintle 20 to the dotted line position of Figure 2. Means are provided to releasably lock the holder 23 and license plate in this lowered inclined position automatically when they are swung to such position by the filling station attendant. This means comprises a small latch element or lever 34, pivotally mounted for vertically swinging movement upon a short horizontal pin 35, rigidly secured within an opening formed in the vertical extension 27 of the holder 23 adjacent one end of the mounting bracket 16. The pin 35 extends laterally outwardly of the adjacent extension 27 and terminates near the adjacent extension 18 of the bracket 16. The pin 35 is provided at its outer end with a head 36, for retaining the pivoted lever 34 thereon. The lever 34 is in substantial alignment with the adjacent extension 18, which extension is provided in its top or rounded or end 19 with a notch or recess 37. The lever 34 has a forward generally horizontal arm 38 terminating in a short depending substantially vertical extension or detent 39 integral therewith, and engageable within the notch 37, Figure 3. The lever 34 further comprises a rear upwardly inclined extension or handle 40, integral therewith, and adapted to be depressed with the finger for elevating the detent 39 from the notch 37. A torsional coil spring 41 surrounds the pin 35 between the extension 27 and lever 34. One end extension or arm 42 of the spring 41 engages over the forward arm 38 of the lever 34 to bias it downwardly or clockwise, Figure 3. The other end extension or arm 43 of spring 41 is suitably anchored to the holder 23 so that the spring may serve to urge the lever 34 in the clockwise direction, Figure 3, at all times. The spring 41 also serves to hold the lever 34 in contact with the head 36 of the pin 35, so that the lever arm 38 will always be aligned above the extension 18. The lever 34 is thus bodily carried by the extension 27, which is a part of the hinged license plate holder 23.

In use, when the filling station attendant swings the holder 23 rearwardly to the position shown in Figure 3 and in dotted lines in Figure 2, the detent 39 rides over the curved end 19 of the extension 18 in the rearward direction, until the notch 37 is reached. The detent 39 will now drop into the notch 37 automatically, under the influence of spring 41, and the license plate holder 23 is then locked in the lowered or inclined position automatically. The closure cap 13 is now uncovered, and the attendant removes the cap and introduces the gasoline into the pipe 12 with the hose nozzle. The nozzle is removed when the tank is full, and the cap 13 is replaced upon the pipe 12. The attendant now depresses the lever extension 40 with his finger, elevating the detent 39 from the notch 37. When this is done, the spring 28 will return the holder 23 and license plate 24 to their normal vertical position, Figure 2, for again concealing the closure cap 13.

It is thus seen that the license plate holder 23 is automatically locked by the lever 34 in the lowered or rearward inclined position during the tank filling operation, and the strong spring 28 cannot cause the holder 23 to improperly swing forwardly and strike the nozzle of the gasoline hose for causing it to scratch the automobile. Also, the operator or attendant may have both hands free during the filling operation, without the fear of the holder 23 swinging forwardly. This enables him to hold the closure cap 13 in one hand while manipulating the hose nozzle with the other hand. This eliminates the possibility of laying the closure cap 13 down somewhere, with the possibility of losing it or forgetting to replace it upon the pipe 12. As previously stated, by simply depressing the lever extension 40 with the finger, the license plate holder 23 may be returned to its upright position.

It should be understood that the pivoted lever 34 may be mounted upon either of the extensions 27, and the notch 37 may be formed in either extension 18 of the bracket 16. This is entirely a matter of choice, and the device will function in the same manner regardless of which end is provided with the latch element or lever 34.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

A license plate holding device to be arranged at the rear of an automobile body having a generally horizontal ledge, a gas tank filler pipe extending near and above the ledge and an upstanding part arranged near and above the filler pipe, said holding device comprising a generally U-shaped bracket including a horizontal base and substantially vertical spaced arms, one arm having a notch formed in its edge near its top, the base being disposed upon the ledge and secured thereto and extending transversely of the automobile body, said arms having openings formed therein near their upper ends, a supporting plate for carrying the license plate, said supporting plate being arranged above the arms when the supporting plate is generally vertical and then covers the filler pipe, resilient elements secured to the upper portion of the supporting plate to engage said vertical part when the supporting plate is substantially vertical, spaced attaching plates arranged between the substantially vertical arms and rigidly secured to the supporting plate and extending outwardly beyond the lower edge of the supporting plate when the supporting plate is substantially vertical, said attaching plates having openings formed therein near their lower ends, said attaching plates being arranged inwardly of and near said substantially vertical arms, a substantially horizontal pivot element extending through the openings in the substantially vertical arms and the openings in the attaching plate, a spring surrounding the pivot element and bearing against one substantially vertical arm and said supporting plate for swinging the supporting plate toward the substantially vertical closed position, a latch disposed near and above the upper end of one substantially vertical arm and in alignment with such arm and provided with a detent, a pin pivotally supporting the latch and substantially horizontally arranged above the top of the adjacent arm and secured to the adjacent attaching plate, and a spring carried by the pin and engaging the latch to swing the same in one direction so that its detent is urged toward the top of the adjacent substantially vertical arm, the notch in such arm being so positioned that the detent will automatically enter the same when the supporting plate is shifted to the open position.

References Cited in the file of this patent

UNITED STATES PATENTS

| | | |
|---|---|---|
| 1,726,398 | Limbocker | Aug. 27, 1929 |
| 1,910,282 | Ellis | May 23, 1933 |
| 2,035,895 | Kelly | Mar. 31, 1936 |
| 2,575,211 | Flacke | Nov. 13, 1951 |
| 2,729,500 | Dickenshied et al. | Jan. 3, 1956 |

FOREIGN PATENTS

| | | |
|---|---|---|
| 539,019 | Great Britain | Aug. 25, 1941 |